United States Patent [19]
Reznikov

[11] Patent Number: 5,232,792
[45] Date of Patent: Aug. 3, 1993

[54] CELL SEPARATOR PLATE USED IN FUEL CELL STACKS

[75] Inventor: Gennady L. Reznikov, Niles, Ill.

[73] Assignee: M-C Power Corporation, Burr Ridge, Ill.

[21] Appl. No.: 934,005

[22] Filed: Aug. 21, 1992

[51] Int. Cl.⁵ .................. H01M 2/08; H01M 8/04
[52] U.S. Cl. ........................ 429/14; 429/35; 429/39
[58] Field of Search .............. 429/35, 14, 18, 34, 429/38, 39

[56] References Cited

U.S. PATENT DOCUMENTS

| | | |
|---|---|---|
| 3,012,086 | 12/1961 | Vahldieck . |
| 3,514,333 | 5/1970 | Novack . |
| 3,589,941 | 6/1971 | Eaton et al. . |
| 3,723,186 | 3/1973 | Borucka et al. . |
| 3,867,206 | 2/1975 | Trocciola et al. . |
| 4,160,067 | 7/1979 | Camara et al. . |
| 4,259,389 | 3/1981 | Vine et al. . |
| 4,329,403 | 5/1982 | Baker . |
| 4,579,788 | 4/1986 | Marianowski et al. . |
| 4,761,348 | 8/1988 | Kunz et al. . |
| 4,781,727 | 11/1988 | Mitsuda et al. . |
| 4,786,568 | 11/1988 | Elmore et al. . |
| 4,824,739 | 4/1989 | Breault et al. . |
| 4,910,101 | 3/1990 | Mitsuda et al. . |
| 4,963,442 | 10/1990 | Marianowski et al. . |
| 5,045,413 | 9/1991 | Marianowski et al. . |

Primary Examiner—Anthony Skapars
Attorney, Agent, or Firm—Speckman, Pauley & Fejer

[57] ABSTRACT

A cell separator plate for separating fuel cell units in fuel cell stacks, the separator plate having a peripheral seal structure extending from each face completely around its periphery and a electrolyte seal structure extending from each face and having a generally flat face spaced inwardly from the separator plate peripheral seal structure and extending completely around the separator plate forming a separator plate/electrolyte seal with an adjacent electrolyte under cell operating conditions, and a peripheral compartment between the separator plate/electrolyte seal and separator plate peripheral seal between adjacent separator plates. The peripheral compartment may contain active electrolyte which may be wicked into the electrolyte matrix through edges of the matrix directly exposed to the peripheral compartment. The peripheral compartment may contain an inert gas to ensure active electrolyte containment within the electrolyte matrix.

28 Claims, 1 Drawing Sheet

CELL SEPARATOR PLATE USED IN FUEL CELL STACKS

BACKGROUND OF THE INVENTION

1. Field of the Invention

This invention relates to high temperature fuel cell stacks, particularly molten alkali metal carbonates fuel cell stacks using thin metal separator plates. The separator plates of this invention provide improved electrolyte containment and may provide make-up electrolyte during cell operation.

2. Description of Related Art

Generally, fuel cell electrical output units are comprised of a stacked multiplicity of individual cells separated by inert or bi-polar electronically conductive ferrous metal separator plates. Individual cells are sandwiched together and secured into a single stacked unit to achieve desired fuel cell energy output. Each individual cell generally includes an anode and cathode electrode, a common electrolyte tile, and a fuel and oxidant gas source. Both fuel and oxidant gases are introduced through manifolds to their respective reactant chambers between the separator plate and the electrolyte tile. The area of contact between the electrolyte and other cell components to maintain separation of the fuel and oxidant gases and prevent and/or minimize gas leakage is known as the wet seal. A major factor attributing to premature fuel cell failure is corrosion and fatigue in the wet seal area. This failure is hastened by corrosive electrolyte contact at high temperatures and high thermal stresses resulting from large temperature variations during thermal cycling of the cell causing weakening of the structure through intracrystalline and transcrystalline cracking. Such failures permit undesired fuel and-/or oxidant gas crossover and overboard gas leakage which interrupts the intended oxidation and reduction reactions thereby causing breakdown and eventual stoppage of cell current generation. Under high temperature fuel cell operating conditions, in the range of about 500° to 700° C., molten carbonate electrolytes are very corrosive to ferrous metals which, due to strength requirements, are necessary for fuel cell housings and separator plates. The high temperature operation of stacks of molten carbonate fuel cells increases both the corrosion and thermal stress problems in the wet seal area, especially when the thermal coefficients of expansion of adjacent materials are different.

Commercially viable molten carbonate fuel cell stacks may contain up to about 600 individual cells each having a planar area in the order of ten square feet. In stacking such individual cells, separator plates separate the individual cells with fuel and oxidant each being introduced between a set of separator plates, the fuel being introduced between one face of a separator plate and the anode side of an electrolyte matrix and oxidant being introduced between the other face of the separator plate and the cathode side of a second electrolyte matrix. The problems of manifolding and sealing become more severe when larger number of cells and larger planar areas are used in the cell stack. When greater number of cells are used, the electrical potential driving the carbonate in the seal area along the height of the stack increases, and when the planar area of the cell increases, the linear tolerances of each component and the side alignment of each component becomes extremely difficult to maintain in order to maintain the mating surface sealed between the manifold/manifold gasket/and cell stack. Cell stacks containing 600 cells can be approximately 10 feet tall presenting serious problems of required stiffness of external manifolds and the application of a clamping force required to force the manifold onto the cell stack. Due to the thermal gradients between cell assembly and cell operating conditions, differential thermal expansions, and the necessary strength of materials used for the manifolds, close tolerances and very difficult engineering problems are presented.

Conventionally, stacks of individual molten carbonate fuel cells have been constructed with spacer strips around the periphery of a separator plate to form wet seals and to provide intake and exhaust manifolds. Various means of sealing in the environment of the high temperature fuel cell wet seal area are disclosed in U.S. Pat. No. 4,579,788 teaching the wet seal strips are fabricated utilizing powder metallurgy techniques; U.S. Pat. No. 3,723,186 teaching the electrolyte itself is comprised of inert materials in regions around its periphery to establish an inert peripheral seal between the electrolyte and frame or housing; U.S. Pat. No. 4,160,067 teaching deposition of inert materials onto or impregnated into the fuel cell housing or separator in wet seal areas; U.S. Pat. No. 3,867,206 teaching a wet seal between electrolyte-saturated matrix and electrolyte saturated peripheral edge of the electrodes; U.S. Pat. No. 4,761,348 teaching peripheral rails of gas impermeable material to provide a gas sealing function to isolate the anode and cathode from the oxidant and fuel gases, respectively; U.S. Pat. No. 4,329,403 teaching graded electrolyte composition for more gradual transition in the coefficient of thermal expansion in passing from the electrodes to the inner electrolyte region; and U.S. Pat. No. 3,514,333 teaching housing of alkali metal carbonate electrolytes in high temperature fuel cells by use of a thin aluminum sealing gasket.

Gas sealing of a phosphoric acid fuel cell, which operates at about 150° to 220° C., by filling the pores of a porous material periphery of the cell constituents with silicon carbide and/or silicon nitride is taught by U.S. Pat. No. 4,781,727; and by impregnating interstitial spaces in substrate plate edge is taught by U.S. Pat. Nos. 4,786,568 and 4,824,739. The solution of sealing and corrosion problems encountered in low temperature electrolytic cells, such as bonding granular inert material with polytetrafluorethylene as taught by U.S. Pat. No. 4,259,389 gaskets of polyethylene as taught by U.S. Pat. No. 3,012,086; and "O" ring seals taught by U.S. Pat. No. 3,589,941 for internal manifolding of fuel only are not suitable for high temperature molten carbonate fuel cells.

U.S. Pat. No. 4,910,101 teaches fuel cell stacks having exterior extensions on the separator plates to form receivers for surplus electrolyte in a gas discharge manifold to the exterior of the fuel cell stack and provides means for return of recovered electrolyte to the same cell from which it leaked without substantial pressure loss. The receivers on the separator plates also provides a method for addition of electrolyte to the operating fuel cell.

U.S. Pat. Nos. 4,963,442 and 5,045,413 teach fully internal manifolded fuel cell stacks wherein the electrolytes and separator plates extend to the edge of the fuel cell stack and form a peripheral wet seal by the separator plate having a flattened wet seal structure extending from each face of the separator plate to contact the electrolytes completely around their periphery to form a separator plate/electrolyte wet seal under fuel cell operating conditions. The electrolytes and separator plates each have a plurality of aligned perforations, the perforations in the separator plates each being surrounded by a flattened manifold wet seal structure extending from each face of the separator plate to contact the electrolytes to form a separator plate/electrolyte wet seal under fuel cell operating conditions thereby providing a plurality of manifolds extending through the fuel cell stack for fully internal manifolding of fuel and oxidant gases to and from each unit fuel cell in the fuel cell stack. U.S. Pat. No. 5,077,148 teaches a fully internal manifolded and internal reformed fuel cell stack having separator plate/electrolyte seals similar to those taught by U.S. Pat. Nos. 4,963,442 and 5,045,413 and having interspersed along its axis a plurality of reforming chambers formed by adjacent separator plates to provide fully internal manifolding of reactant gas and steam to product gas from each reformer unit in the fuel cell stack.

SUMMARY OF THE INVENTION

It is an object of this invention to provide high temperature fuel cell stacks having increased long term stability as a result of improved electrolyte sealing with reduced electrolyte loss and reduced corrosion.

It is another object of this invention to provide high temperature fuel cell stacks having an internal supply of make-up active electrolyte.

It is still another object of this invention to provide molten alkali metal carbonates electrolyte fuel cell stacks of high long term stability and internal supply of make-up electrolyte.

These and other objects and advantages of the invention which will become apparent upon reading the detailed description may be achieved in fuel cell stacks of a plurality of fuel cell units, each fuel cell unit having an anode, a cathode, an electrolyte in contact on one side with the electrolyte facing face of the anode and in contact on the opposite side with the electrolyte facing face of the cathode, and a separator plate forming an anode chamber between the anode facing face of the separator plate and the separator plate facing face of the anode and a cathode chamber between the opposite cathode facing face of the separator plate and the separator plate facing face of the cathode of an adjacent fuel cell unit. The anode chamber is in gas communication with fuel gas supply and outlet and the cathode chamber is in gas communication with oxidant supply and outlet. In each fuel cell unit according to the present invention, the electrolyte terminates inwardly from the periphery of the separator plate. The separator plate has an electrolyte seal structure extending outwardly from each face, the electrolyte seal structure having a width to contact, preferably less than about 1 inch width, at the periphery of the electrolyte completely around the periphery of the electrolyte forming a separator/electrolyte seal, preferably less than 1 inch width, under fuel cell operating conditions. The separator plate extends beyond the periphery of the electrolyte and has a separator plate peripheral seal structure spaced beyond the periphery of the electrolyte seal structure and extending outwardly from each face of the separator plate. Sealing means are provided at the separator plate peripheral seal structure to form with an adjacent separator plate peripheral seal structure, when in the fuel cell stack, a peripheral separator plate seal completely around the periphery of the separator plate thereby forming a peripheral compartment between the separator plate/electrolyte seal and the peripheral separator plate seal. In the fuel cell stack, the end plates are configured the same as the corresponding separator plate face on their inner faces and form half cells on each end of the fuel cell stack.

In preferred embodiments, the separator plate/electrolyte seal is a wet seal having a width of about ¼ to about ¾ inch. The separator plate/electrolyte wet seal is preferably formed by molten alkali metal carbonates electrolyte.

It is preferred that the separator plate is a pressed metal plate about 0.010 to about 0.050 inch thick and that the separator plate on the anode facing face is coated or clad with a metal selected from nickel and copper.

In one embodiment, the separator plate peripheral seal structure and electrolyte seal structure is formed by a single pressed metal shape with one such shape fastened to at least one face of the separator plate, and preferably to each face of the separator plate.

In one embodiment, the separator plate peripheral seal structure and electrolyte seal structure on one face of the separator plate is a pressed shaping of the plate to form the separator plate peripheral seal structure and electrolyte seal structure extending outwardly from one face of the separator plate and on the other face is a pressed sheet metal shape fastened to that other face to form the separator plate peripheral seal structure and electrolyte seal structure extending outwardly from that face.

It is preferred that the sealing means forming the separator plate peripheral seal be more resilient than the matrix of the electrolyte forming the separator plate/electrolyte wet seal.

The peripheral compartment between the separator plate/electrolyte seal and the separator plate peripheral seal preferably contains active electrolyte which may be wicked into the active volume through the electrolyte matrix directly exposed to the peripheral compartment. This make-up electrolyte which may be directly wicked into each fuel cell unit from the corresponding peripheral compartment makes up for any loss of electrolyte from the fuel cell unit and provides greater fuel cell stack stability and duration of operational time.

BRIEF DESCRIPTION OF THE DRAWING

The above objects and advantages of this invention will become further apparent upon reading the detailed description of preferred embodiments in reference to the drawing wherein.

DESCRIPTION OF PREFERRED EMBODIMENTS

Figure 1:
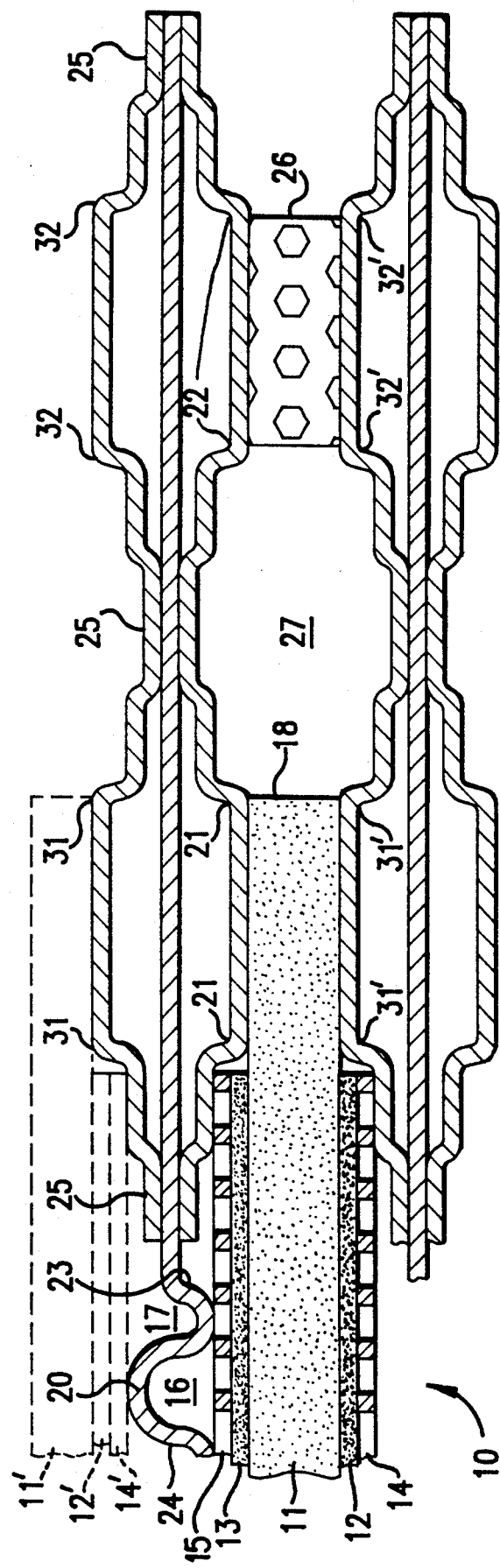
FIG. 1 is a sectional view of a portion of the peripheral area of a separator plate according to one embodiment of this invention.

The fuel cell separator plates according to the present invention are suitable for use in stacks of any type of fuel cell units having planar components, especially high temperature fuel cells such as molten alkali metal carbonates and solid conductor/solid oxide fuel cells. Such fuel cell units and stacks together with their components have been described in more detail in U.S. Pat. Nos. 4,963,442, 5,045,413, and 5,077,148 which are incorporated herein in their entirety by reference. These patents describe suitable anode, cathode, current collector, electrolyte, and separator plate components and their configurations, materials and functioning which is the same as practiced in the present invention except in the peripheral area as described below. The separator plates of this invention are particularly suitable for use in fully internally manifolded fuel cell stacks and in internal reformed fuel cell stacks as described in the above patents. However, the separator plates of this invention may be used in fuel cell stacks of any shape or configuration having planar components.

This invention is concerned with the peripheral region of the separator plates. The internal portion of the separator plate may be of any configuration to promote good circulation of gases in the anode and cathode compartments. For large separator plates, in the order of 10,000 cm$^2$ for commercial sized fuel cell stacks, it may be desirable to provide multiple active areas on the face of the separator plate, but this does not alter the peripheral regions as described in the present invention. The separator plates of this invention may be used with any configuration of the separator plate for internal manifolding and/or internal reforming. Likewise, the mounting of electrodes may be varied from that shown in the Figures.

Separator plates may be comprised of suitable materials providing desired physical strength and gas separation. The separator plates are desirably very thin, about 0.010 to about 0.050 inch thick, preferably about 0.015 to about 0.025 inch thick. In many cell stacks it is preferred to use bimetallic separator plates in which stainless steel may be used on the cathode face and nickel or copper on the anode face to avoid ferrous metal corrosion. The nickel or copper may be a cladding, lamination or plating about 10 percent the thickness of the separator plate. Separator plates may also be fabricated from ferrous alloys, such as type 300 series stainless steel alloys. The separator plates provide the dual function of providing a gas chamber non-reactive separator as well as providing structural strength to the fuel cell as an internal load bearing member. While it is preferred to use separator plates having a corrugated and/or dimpled cross-sectional shape in the active area to provide both strength and better gas circulation adjacent the electrodes, the principles of this invention are also applicable to flat separator plates structured to provide peripheral seal areas and to provide seals around internal manifold holes while allowing gas to pass to and from the internal manifolds as required for fuel cell operation. Thin stamped stainless steel plates suitable for use in this invention are similar in the active area to those used in heat exchange technology as described in the publications "Modern Designs For Effective Heat Transfer," American Heat Reclaiming Corp., 1270 Avenue of the Americas, New York, N.Y. 10020, and "Supercharger Plate and Frame Heat Exchanger," Tranter, Inc. Wichita Falls, Tex. 76307.

As shown in FIGS. 1 and 2 of each of the U.S. Pat. Nos. 4,963,442 and 5,077,148, electrolyte 20 and separator plate 40 extend to the outer edge of the cell and are sealed to each other around their periphery in wet seal areas 23. The individual molten carbonate fuel cell unit is shown with anode 26 spaced from one face of separator plate 40 to provide an anode chamber fed by fuel manifold hole 24 as indicated by arrow 38. On the other face of separator plate 40 cathode 27 is spaced from separator plate 40 to form a cathode chamber in communication with oxidant manifold holes 25 as indicated by arrow 39. Electrolyte 20 and separator plate 40 extend to the outer edge of the cell forming peripheral wet seal areas 23 which provide peripheral wet seals between the electrolyte and separator plate for containment of fluid. Fuel manifold wet seal area 45 and oxidant wet seal area 46 provide manifold sealing by electrolyte/separator plate wet seals and provide desired guidance of fluid to anode and cathode chambers on opposite sides of separator plate 40. No additional gaskets are used for sealing and the cell unit can accommodate a wide variety of carbonate addition techniques, including use of carbonate tapes. In the present invention, the active cell areas, the internal manifolds, and internal reforming may be the same as described in these patents. The present invention relates to double sealing arrangements, an electrolyte/separator plate seal at the periphery of the electrolyte and spaced beyond the periphery of the electrolyte a separator plate/separator plate seal at the periphery of the separator plates forming a peripheral compartment therebetween.

FIG. 1 is one embodiment of this invention, not drawn to scale, showing in detail a peripheral area of fuel cell unit 10 in accordance with one embodiment of this invention. Fuel cell unit 10 components are drawn in solid lines and partial components of adjacent fuel cell units are drawn in dashed lines. Thin sheet separator plate 20 is corrugated with the peaks on anode facing face 23 of separator plate 20 adjacent anode 13 current collector 15 forming anode chambers 16 while peaks on cathode facing face 24 of separator plate 20 adjacent cathode 12' current collector 14, of an adjacent fuel cell unit form cathode chambers 17. Electrolyte 11 terminates with end 18 inwardly from the periphery of separator plate 20 as shown in FIG. 1. By periphery of the separator plate is meant the termination of the plate structure beyond the separator plate peripheral seal including any seal structure attached to the separator plate structure itself. Separator plate 20 has electrolyte seal structure 21 extending outwardly from one face and electrolyte seal structure 31 extending outwardly from its opposite face sized to contact electrolyte 11 completely around the electrolyte periphery to form a separator plate/electrolyte seal under cell operating conditions. By the terminology "extending outwardly" from a face of the separator plate as used throughout this description and claims is meant outwardly from a generally flat separator plate extending through the central region of and parallel to the shaped separator plates used in this invention. Separator plate 20 extends beyond the periphery of electrolyte 11 and has separator plate peripheral seal structure 22 extending outwardly from one face and separator plate peripheral seal structure 32 extending outwardly from its opposite face. The separator plate peripheral seal structures and electrolyte seal structures may be obtained in a variety of ways and this invention is intended to include all configurations and manners of fastening such structures to the separator plate as long as a separator plate/electrolyte seal is formed at the periphery of the electrolyte and a separator plate/separator plate seal is formed at the periphery of adjacent separator plates to form a peripheral compartment therebetween with end 18 of the electrolyte in communication with that compartment. FIG. 1 shows separator plate 20 extending as a generally flat plate from the active area of the cell to the periphery of the cell with a separate structure forming electrolyte seal structure 21 and separator plate peripheral seal structure 22 fastened to one face and a second separate structure forming electrolyte seal structure 31 and separator plate peripheral seal structure 32 fastened to the opposite face of separator plate 20. Separator plate 20 may be pressed to form the electrolyte seal structure and separator plate peripheral seal structure extending from one face while a pressed sheet metal shape having the desired electrolyte seal structure and separator plate peripheral seal structure is fastened to the opposite face of separator plate 20 to form the electrolyte seal structure and peripheral seal structure extending outwardly from the opposite face of separator plate 20. In each of these specific embodiments, the electrolyte seal structure and separator plate peripheral seal structure comprises a pressed sheet metal shape fastened to at least one face of the separator plate. Such metal shapes may be fastened to separator plate 20 by any suitable means known to the metal fastening art, such as by welds 25. However, it is readily apparent to one skilled in the art that the desired structure and functions of a electrolyte/separator plate seal at the periphery of the electrolyte and a separator plate/separator plate seal at the periphery of adjacent separator plates providing a peripheral compartment therebetween may be achieved by a number of different structures which are included within this invention.

In one preferred embodiment of this invention, molten alkali metal carbonates electrolyte is used and in this case it is preferred that the separator plate/electrolyte seal is a wet seal as is known in the art of molten carbonate fuel cells. The wet seals are formed due to pressure from the upstanding wet seal areas on both faces of the separator plates around the periphery of the electrolyte and around each of any internal manifolds when the cell stack is tightened together. Narrow wet seal areas have been found to function better than wider ones. It is desired that the upstanding wet seal areas be constructed of the same thin material as the separator plate, about 0.010 to about 0.050 inch thick and preferably about 0.015 to about 0.025 inch thick, with a flattened wet seal contact width of less than about 1 inch in order to avoid sagging and yielding which leads to leaking. Preferably, the width of the flattened wet seal contact structure is about 0.25 to about 0.75 inch to avoid the necessity of internal bridging and supports. Further, wet seals of up to about 1 inch wide provide required complete removal of organic binders from green electrolyte matrix tapes during cell heat-up to allow good carbonate electrolyte retention in the electrolyte matrix. Wet seals wider than about 1 inch show indications of residual carbonaceous material and lesser amounts of carbonate electrolyte which could lead to leaky wet seal during cell operations. The cell unit according to this invention can accommodate a wide variety of carbonate addition techniques, including use of carbonate tapes. Similar wet seals may be formed around each of the internal manifolds by similar upstanding electrolyte seal structures on each side of the separator plate. The porous electrodes may be filled with a higher melting material, such as a brazing material, in the areas of the wet seals to prevent leakage of the liquid electrolyte through the electrodes under cell operating conditions.

When carbonate tapes are used, the carbonate tapes and electrolyte matrix extend across the electrolyte/separator plate seal area and although the inter-cell spacing decreases in proportion to the thickness of the carbonate tapes when they melt, sealing and conformity of all cell components is maintained at all times due to the tightening force on the cell stack, the resiliency of the electrolyte seal structure and the separator plate peripheral seal structure and peripheral sealing means as will be further explained. During cell heat-up prior to carbonate tape melting, sealing is maintained because the carbonate tapes and the electrolyte matrix, such as $LiAlO_2$, extend adjacent to the respective sealing surfaces and contain a rubbery binder. During binder burnout, which occurs prior to carbonate melt, gas flows are maintained in manifolds and electrolyte or inert gas maintained in the peripheral compartment which aids in maintaining sealing. When the binder is burned off and the cell temperature raised to the melting point of the carbonate, the melting carbonate is absorbed by the porous $LiAlO_2$ tape and the electrodes. The inter-cell spacing decreases as the carbonate tapes melt but at all stages from temperature to operating temperatures of about 650° C. cell sealing is maintained. The limited flexibility and resiliency of the thin sheet metal in the seal areas aids in assuring maintenance of cell sealing.

The separator plate peripheral seal structure is spaced beyond end 18 at the periphery of electrolyte 11 and extends outwardly from each face of the separator plate. As shown in FIG. 1 separator plate seal structure 22 extends outwardly from one face of the separator plate and separator plate seal structure 32 extends outwardly from the opposite face of the separator plate and peripheral compartment 27 is formed between the electrolyte seal and the separator plate peripheral seal. The separator plate peripheral seal structure may be any shape suitable to form a resilient and tight seal completely around the periphery of the separator plate. Preferably thin sheet metal is used to provide desired resilient forms as described with respect to the electrolyte seal structures. Any suitable sealing means may be used between adjacent separator plate peripheral seal structures, such as a suitably resilient material which withstands cell operating temperatures shown as 26 in FIG. 1. It is desired that the separator plate peripheral seal have greater resiliency than the electrolyte seal to accommodate the loss of thickness of electrolyte tapes upon cell operation, as described above. Peripheral sealing means 26 may be fabricated from refractory oxides, such as MgO or aluminates such as $LiAlO_2$, and a mixture of salts which are stable under cell operating conditions, such as carbonates $K_2CO_3/Li_2CO_3/Na_2CO_3$.

Peripheral compartment 27 may be filled with $CO_2$ to assist in electrolyte containment within each cell and may be filled with make-up active electrolyte. Make-up active electrolyte can be stored in peripheral compartment 27 and passed during cell operation into the electrolyte matrix through edges 18 of the electrolyte directly exposed to the peripheral compartment. When electrolyte is stored in the peripheral compartment, the separator plate peripheral seal may be a wet seal utilizing the electrolyte.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of the invention.

I claim:

1. In a fuel cell stack comprising a plurality of fuel cell units, each said fuel cell unit comprising an anode, a cathode, an electrolyte in contact on one side with the electrolyte facing face of said anode and in contact on the opposite side with the electrolyte facing face of said cathode, and a separator plate forming an anode chamber between the anode facing face of said separator plate and said separator plate facing face of said anode and said separator plate forming a cathode chamber between the opposite cathode facing face of said separator plate and the separator plate facing face of the cathode of an adjacent said fuel cell unit, said anode chamber in gas communication with fuel gas supply and outlet and said cathode chamber in gas communication with oxidant supply and outlet, the improvement comprising; said electrolyte terminating inwardly from the periphery of said separator plate, said separator plate having a electrolyte seal structure extending outwardly from each face, said electrolyte seal structure contacting the periphery of said electrolyte completely around the periphery of said electrolyte forming a separator plate/electrolyte seal under cell operating conditions, said separator plate extending beyond the periphery of said electrolyte and having a separator plate peripheral seal structure spaced beyond the periphery of said electrolyte and extending outwardly from each face of said separator plate, and sealing means at said separator plate peripheral seal structure to form with adjacent separator plates when in said fuel cell stack a peripheral separator plate seal completely around the periphery of said separator plate thereby forming a peripheral compartment between said separator plate/electrolyte seal and said peripheral separator plate seal.

2. In a fuel cell stack according to claim 1 wherein end plates of said fuel cell stack are configured the same as the corresponding separator plate face on their inner faces and form half cells on each end of said fuel cell stack.

3. In a fuel cell stack according to claim 1 wherein each said separator plate is a pressed metal plate about 0.010 to about 0.050 inch thick.

4. In a fuel cell stack according to claim 1 wherein said separator plate peripheral seal structure and said electrolyte seal structure on one face of each said separator plate comprises a pressed shaping of said plate to form said peripheral seal structure and said electrolyte seal structure extending from said one face and on the other face of said separator plate comprises a pressed sheet metal shape fastened to said other face to form said peripheral seal structure and said electrolyte seal structure extending from said other face.

5. In a fuel cell stack according to claim 1 wherein said separator plate peripheral seal structure and said electrolyte seal structure comprise a pressed sheet metal shape fastened to at least one face of said separator plate.

6. In a fuel cell stack according to claim 1 wherein said separator plate/electrolyte seal is a wet seal.

7. In a fuel cell stack according to claim 6 wherein the width of said wet seal is about ¼ to about ¾ inch.

8. In a fuel cell stack according to claim 1 wherein the width of said separator plate/electrolyte seal is less than about 1 inch.

9. In a fuel cell stack according to claim 1 wherein each said separator plate on said anode facing face is coated or clad with a metal selected from the group consisting of nickel and copper.

10. In a fuel cell stack according to claim 1 wherein said electrolyte comprises alkali metal carbonates.

11. In a fuel cell stack according to claim 1 additionally comprising a current collector between each said anode and said separator plate and each said cathode and said separator plate.

12. In a fuel cell stack according to claim 1 wherein said sealing means comprises a sealing strip more resilient than the matrix of said electrolyte.

13. In a fuel cell stack according to claim 1 wherein said peripheral compartment contains active electrolyte supply which may be wicked into electrolyte matrix through edges of said electrolyte matrix directly exposed to said peripheral compartment.

14. In a fuel cell stack according to claim 1 wherein said peripheral compartment contains an inert gas.

15. In a fuel cell stack according to claim 1 wherein said electrolyte and said separator plate each has a plurality of aligned perforations, each of said perforations in said separator plate being surrounded by a flattened manifold seal structure extending from each face of said separator plate, said manifold seal structure having a width to contact less than about 1 inch width of one of said electrolyte forming separator plate/electrolyte manifold seals less than about 1 inch width under cell operating conditions to form a plurality of gas manifolds extending through said cell stack, conduits through extended manifold seal structures of one set of manifolds on said anode facing face providing fuel and exhaust gas communication between said one set of manifolds and said anode chambers, and conduits through extended manifold seal structures of a second set of manifolds on said cathode facing face providing oxidant and exhaust gas communication between said second set of manifolds and said cathode chambers, thereby providing fully internal manifolding of fuel and oxidant gases to and from each said unit fuel cell in said fuel cell stack.

16. In a fuel cell stack according to claim 1 wherein said fuel cell stack has interspersed along its axis a plurality of reforming chambers each formed by two separator/reformer plates, one having the configuration of said anode facing face and the second having the configuration of said cathode facing face, said two separator plates sealingly joined in their edge area to enclose a reformer chamber, supply means providing reaction gas and steam to said reformer chamber, and hydrogen product withdrawal means in communication with said fuel gas supply.

17. In a fuel cell stack according to claim 1 wherein said cell stack end plates are configured the same as said separator plate on their corresponding inner faces and form half cells on each end of said fuel cell stack, said separator plate is pressed metal about 0.010 to about 0.050 inch thick, said separator plate peripheral seal structure and said electrolyte seal structure comprise a pressed sheet metal shape fastened to at least one face of said separator plate, and said electrolyte comprises alkali metal carbonates.

18. In a fuel cell stack according to claim 17 wherein said sealing means comprises a sealing strip more resilient than the matrix of said electrolyte and said peripheral compartment contains active electrolyte supply which may be wicked into electrolyte matrix through edges o said electrolyte matrix directly exposed to said peripheral compartment.

19. A fuel cell separator plate comprising a thin metallic plate having a separator plate peripheral seal structure extending from each face of said metallic plate completely around its periphery and a electrolyte seal structure extending from each face of said metallic plate and having a generally flat face spaced inwardly from said separator plate peripheral seal structure and extending completely around said metallic plate in said inwardly spaced relation, said generally flat face capable of forming a separator plate/electrolyte seal with an adjacent electrolyte under cell operating conditions.

20. A fuel cell separator plate according to claim 19 wherein said metallic plate is pressed metal about 0.010 to about 0.050 inch thick.

21. A fuel cell separator plate according to claim 19 wherein said separator plate peripheral seal structure and said electrolyte seal structure comprise a pressed sheet metal shape fastened to at least one face of said separator plate.

22. A fuel cell separator plate according to claim 19 wherein said separator plate/electrolyte seal is a wet seal.

23. A fuel cell separator plate according to claim 22 wherein the width of said generally flat face is about ¼ to about ¾ inch.

24. A fuel cell separator plate according to claim 19 wherein the width of said generally flat face is less than about 1 inch.

25. A fuel cell separator plate according to claim 19 wherein the anode facing face is coated or clad with a metal selected from the group consisting of nickel and copper.

26. A process for adding make-up active electrolyte to a fuel cell unit in a fuel cell stack comprising; storing said make-up active electrolyte in a peripheral compartment formed by adjacent separator plates between a separator plate/electrolyte seal around the periphery of the electrolyte matrix and a separator plate peripheral seal around the periphery of adjacent separator plates spaced outwardly from said separator plate/electrolyte seal, and passing said make-up active electrolyte from said peripheral compartment into said electrolyte matrix through the edges of said electrolyte matrix directly exposed to said peripheral compartment.

27. In the process for adding make-up active electrolyte according to claim 26 wherein said separator plate/electrolyte seal is a wet seal less than about 1 inch width.

28. In the process for adding make-up active electrolyte according to claim 26 wherein said electrolyte comprises alkali metal carbonates.

* * * * *